Feb. 4, 1947.　　　C. A. WIKEN ET AL　　　2,415,121
DRILL GRINDER
Filed March 10, 1943　　　4 Sheets-Sheet 1
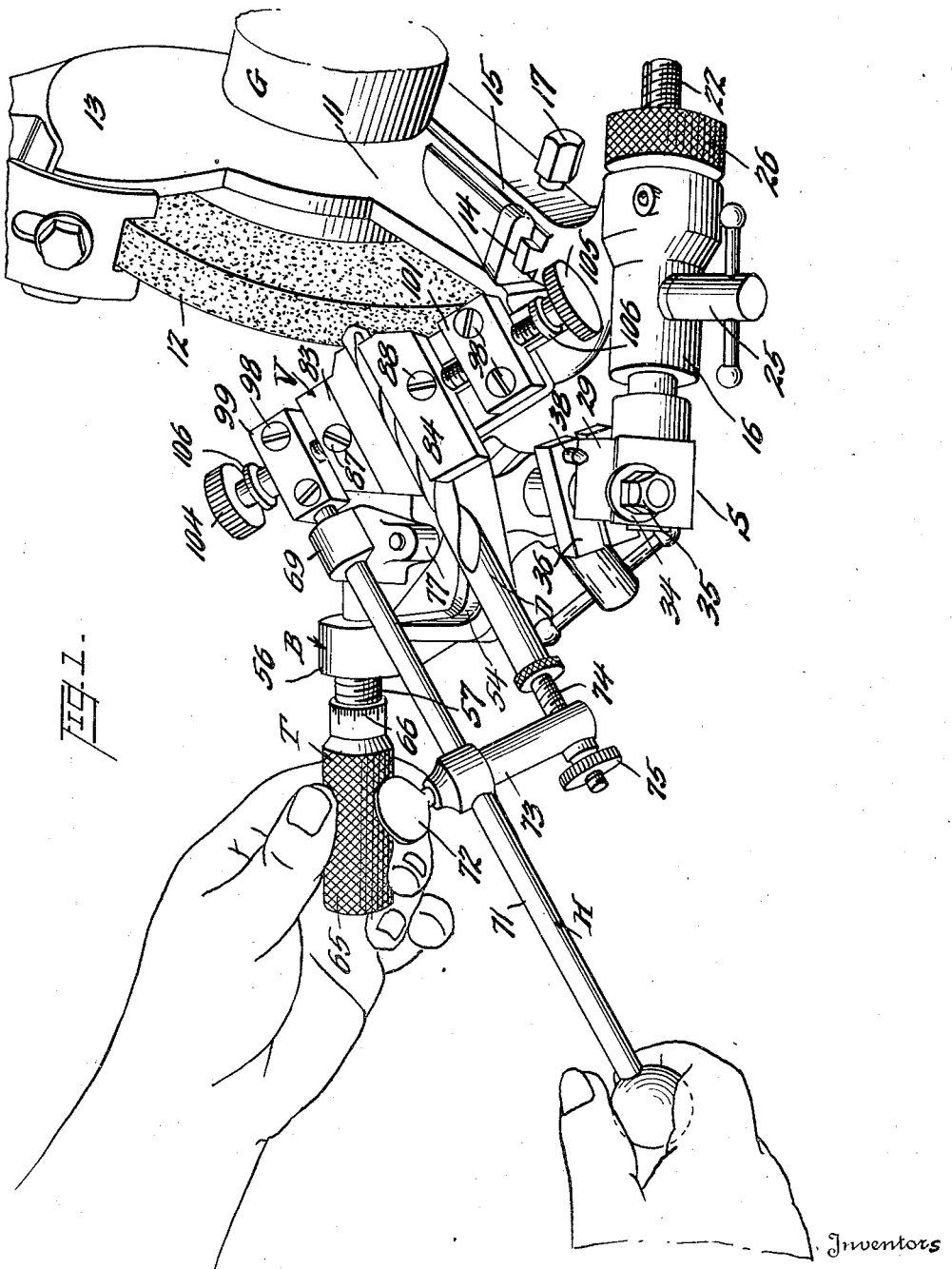
Inventors
Christy A. Wiken
Hugo V. Boehnke
By Strauch & Hoffman
Attorneys

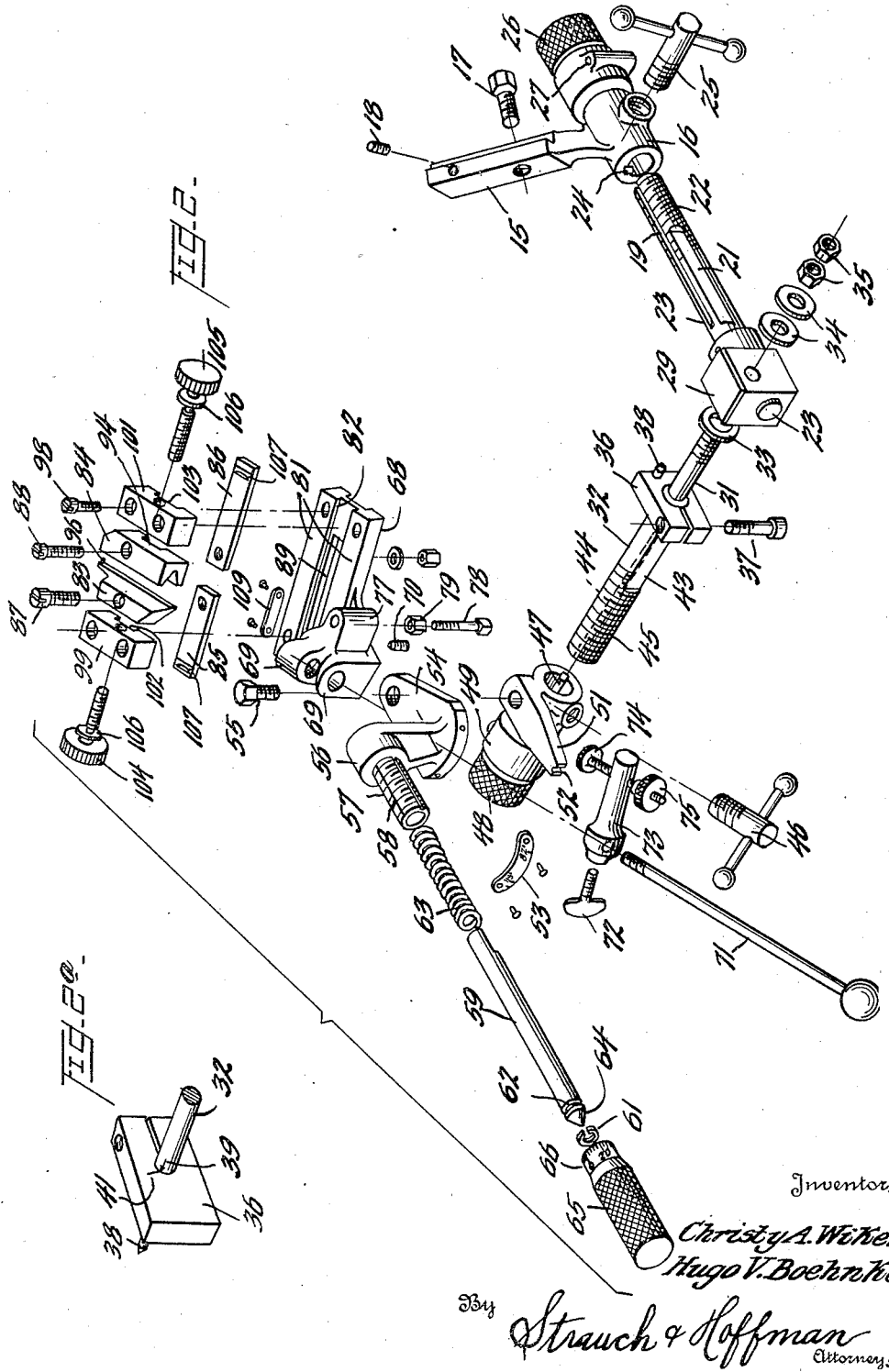

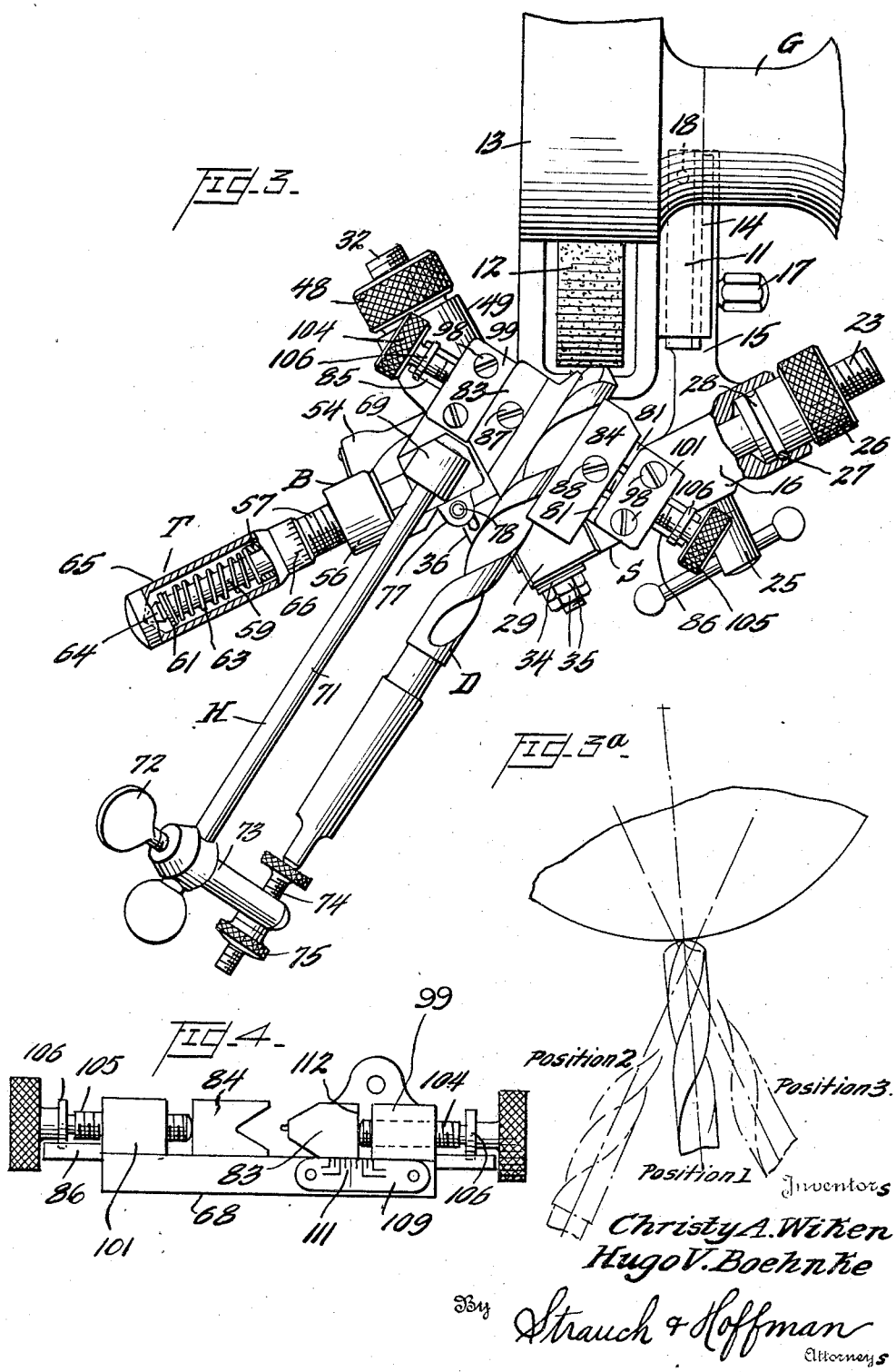

Feb. 4, 1947. C. A. WIKEN ET AL 2,415,121
DRILL GRINDER
Filed March 10, 1943 4 Sheets-Sheet 4
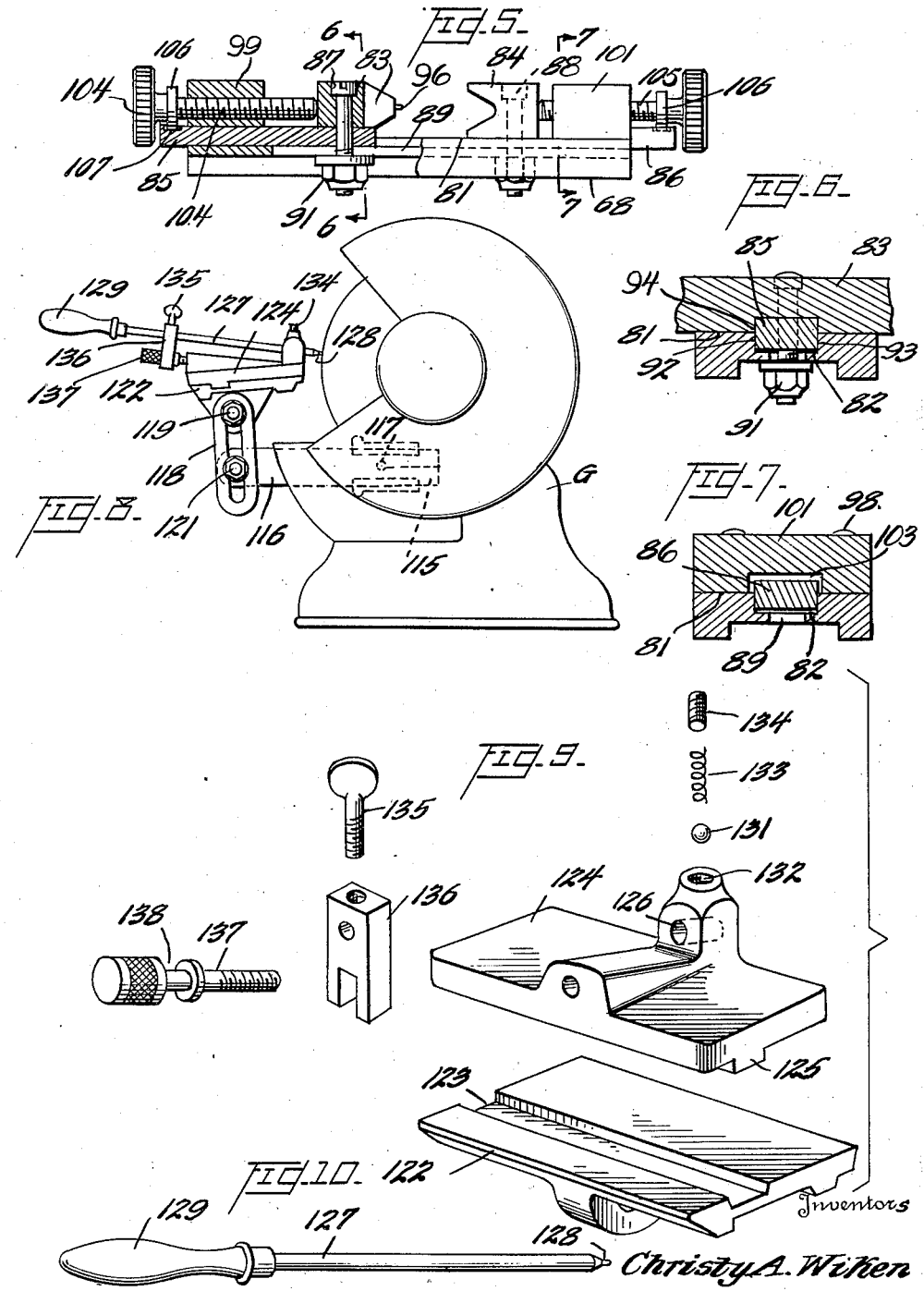

Patented Feb. 4, 1947

2,415,121

UNITED STATES PATENT OFFICE 2,415,121

DRILL GRINDER

Christy A. Wiken and Hugo V. Boehnke, Milwaukee, Wis., assignors, by mesne assignments, to Rockwell Manufacturing Company, Pittsburgh, Pa., a corporation of Pennsylvania Application March 10, 1943, Serial No. 478,706

18 Claims. (Cl. 51—219)

The present invention relates to grinding apparatus, more particularly apparatus for gripping a drill and feeding it toward the peripheral face of a grinding wheel for sharpening it.

Apparatus have been heretofore proposed for sharpening drills by feeding them against the periphery of a grinding wheel, but they are open to the objections that most of them constitute specially designed machines, adapted solely for the purpose of grinding drills and are incapable of carrying out any other grinding operation, and they also lack sufficient features to permit accurate grinding of the various types and sizes of drills met with in every day practice, which materially limits their use. While other devices of the prior art have been constructed for attachment to conventional grinders, they have not achieved any real degree of success and have not gone into use because they are designed to present the drill to the side face of the wheel and also fail to provide for sufficiently accurate manipulation of the drill to grind the lip and clearance angles with the degree of accuracy required and are incapable of handling a wide variety of sizes and types of drills, or handling the variations in lip and clearance angles that must be made, and certain attachments of the prior art require so much space that it is impossible to properly guard the wheel.

We have discovered that by providing a drill holding vise and a supporting assembly of novel form, made up of a mounting bracket adjustably mounted on the machine to one side of the wheel for movement normal to the wheel axis, and a shaft assembly slidable in the mounting bracket in a direction oblique to the wheel axis, and supporting a feed screw bracket on the shaft assembly to the other side of the wheel, for adjustment about a substantially vertical axis and for sliding movement in a direction substantially at right angles to the direction of sliding movement of the shaft assembly in the mounting bracket, and also providing for limited rocking of the feed screw bracket about the axis of one of the parts of the shaft assembly; and by mounting the drill vise directly on the feed screw, for rocking movement about the feed screw axis, and for accurate feeding movement along the feed screw axis, and providing a drill vise which tightly grips the drill over a material portion of its length and embodies means for accurately locating the drill in drill grinding position, an efficient, low cost drill grinding attachment of simple yet rugged design is achieved, which may readily be applied to, and removed from, existing grinding machines which embody guards substantially completely enclosing the wheel. The improved device also makes it possible to adjust the drill vise directly toward the wheel periphery, to successively compensate for the decrease in wheel diameter incident to normal wheel wear; to also adjust the vise along the face of the wheel, so as to properly adjust the drill to the wheel and also makes possible the utilization of the full width of the wheel for drill grinding; to readily swing the drill vise away from the wheel for inspecting the drill point during grinding or drill changing, without disturbing the feed screw setting; to accurately establish the proper lip and clearance angles and also vary both the lip and clearance angles for different types of drills; and to accurately center the drill with respect to the axis of the feed screw.

It is accordingly the major object of the invention to provide a novel drill grinding apparatus of simple, low cost and yet efficient and rugged design, which feeds the drill to the wheel periphery and yet permits effective shielding of the wheel and also may be successively adjusted to compensate for decreasing wheel diameter incident to normal wheel wear as well as be adjusted parallel to the wheel axis, to present the drill to various portions of the wheel periphery, and in which the drill may be quickly swung away from the wheel for inspection or repositioning of the drill during grinding.

A further important object is to provide a drill grinding apparatus embodying a novel vise support assembly having a major adjusting means, by which the vise may be adjusted directly toward the wheel periphery by large increments, and a minor adjusting means, by which the vise may be adjusted by small increments toward and away from the wheel and also may be adjusted along the face of the wheel.

Another object is to provide a drill grinding apparatus having a drill vise mounted for oscillation in a bracket about a predetermined axis with respect to the drill point, with means for accurately adjusting the vise along the axis to feed the drill to the grinding wheel periphery; means for angularly adjusting the feed screw bracket to vary the lip angle ground on the drill; means for rocking the feed screw bracket about an axis operable to swing the drill away from the wheel periphery, for drill inspection or drill changing, without disturbing the feed screw setting, means for accurately stopping the feed screw bracket when it is swung back toward the wheel; and to so locate the rocking axis that the bracket may be rocked through small angles to effect a variation in the clearance angle ground on the drill.

Further objects are to provide novel means for rigidly securing the drill grinding attachment to the tool rest guideway of existing grinding machines, designed to compensate for any looseness in the guideway and insure a rigid mounting; to provide a novel drill-holding vise embodying means for insuring proper centering of all drills on a common axis, within the range of drill sizes and types which the attachment is capable of handling, and having means for resisting twisting torque developing during drill grinding and separate screws for applying gripping forces to the jaws and means, having a lost-motion connection with the screws, for positively retracting the jaws when the screws are backed off; to provide an adjustable stop assembly for limiting swing of the drill vise through a predetermined angle, making it possible to grind three and four-lipped drills as well as two-lipped drills, and to provide a novel wheel dressing device.

Certain of the foregoing improvements are disclosed in our co-pending application Serial No. 424,364, for "Drill grinders," filed December 24, 1941, of which this application is a continuation-in-part.

Further objects will become apparent as the specification proceeds in conjunction with the annexed drawings, and from the appended claims.

In the drawings:

Figure 1 is a perspective view illustrating the drill grinding apparatus of the invention applied to a conventional grinding wheel;

Figure 2 is an "exploded" or disassembled view of the parts of the apparatus shown in Figure 1;

Figure 2A is a perspective fragmental view of the stop collar of the device shown in Figures 1 and 2;

Figure 3 is a top plan view of the apparatus shown in Figure 1;

Figure 3A is a fragmental side elevational view of the structure shown in Figure 3, showing the manner in which the drill tip is ground;

Figure 4 is a side elevational view of the drill holding vise of the invention, illustrating the jaws in open or vise receiving position;

Figure 5 is a vertical sectional view through the drill vise of Figure 4;

Figure 6 is a transverse sectional view of the vise taken substantially on the line 6—6 of Figure 5, looking in the direction of the arrows;

Figure 7 is a transverse sectional view taken substantially on the line 7—7 of Figure 5;

Figure 8 is a side elevational view of the grinding wheel structure shown in Figure 1, with the grinder attachment removed and replaced by a wheel dressing device which also forms part of the invention;

Figure 9 is a disassembled view of the parts of the wheel dressing device; and

Figure 10 is a perspective view of the wheel dressing tool shown in Figures 8 and 9.

With continued reference to the drawings, wherein like reference characters have been employed to designate similar parts throughout the several views thereof, and referring particularly to Figure 1, the drill grinding apparatus of the invention is illustrated as being applied to a grinder designated generally by the reference character G. The drill grinding attachment is supported by means of a double armed support assembly S, carried by the grinder frame. Mounted upon support S, for adjustment about a substantially vertical axis, is a feed screw bracket B, in which a drill vise V, carrying a drill D, is mounted for rocking movement. By rotating a micrometer thimble T, the drill vise may be advanced toward the grinding wheel in successive steps and the entire vise rocked by a handle H between each step, to effect extremely accurate grinding of the drill tip, as will be later described in detail.

Taking up the specific embodiment of the invention illustrated, and referring to Figures 1 and 2, grinder G is made up of a frame 11 in which a shaft is mounted in bearings (not shown) in well known manner and supports a grinding wheel 12 at its end. Frame 11 is also provided with a guard structure 13, which encloses both side faces and the periphery of the wheel, except for a sector of approximately ninety degrees, as illustrated in Figure 1. The grinding wheel shaft is rotated by any suitable power, but in the present instance the shaft is mounted directly on the armature shaft of a motor built into frame 11 and carries another wheel on its other end (not shown).

We have found that by providing the novel supporting assembly of the present invention it is possible to support a grinding attachment in stable manner upon the general type of guarded grinder illustrated, without requiring removal of any part of the wheel guard, and yet the drill grinding mechanism is supported in such manner as to permit it to be successively adjusted toward the grinding wheel as the latter wears down through use, thereby providing a structure which may be readily attached to existing grinders; will accurately grind a wide variety of types and sizes of drills; and at the same time is fully adjustable to compensate for variations in wheel size.

Referring now to Figures 1 and 2, grinder frame 11 is provided with a guideway or T-slot 14, of substantially rectangular cross section and extending parallel to the plane of the wheel. Mounted for adjustable sliding movement in the T-slot is a shank 15, of substantially T-shape and cross section, of the post or main support 16 for the grinding attachment. The support is adapted to be locked in adjusted position by a screw 17 threaded into the shank adjacent the front end. A set screw 18 threaded into the rear end of the shank cooperates with the upper face of the guideway 14 to eliminate lost motion and prevent the weight of the device from tilting the shank downward in its guide, even if the T-slot is somewhat oversize, thereby insuring proper alignment of the parts at all times.

Mounted for sliding movement in a smooth bore in support 16, and having a longitudinal keyway 19; a flat 21; and a threaded portion 22 is a bar or arm 23. A key 24 in support 16 cooperates with keyway 19 to restrain arm 23 against rotation in the support. A clamp bolt 25 threaded into support 16 cooperates with flat 21 to lock arm 23 in adjusted position.

While arm 23 may be grasped and slid into and out of support 16, we preferably employ a knob or sleeve 26, seating in a recess in the end of support 16 and coacting with screw threads 22 to positively feed the arm in and out. Knob 26 is secured against endwise displacement by a pin 27 secured in support 16 and cooperating with a groove 28 in a sleeve portion of the knob.

Rigidly secured to the free end of arm 23 is a head 29, in which the shank 31 of a second bar 32 is mounted for limited frictional rocking movement. The parts are secured in place by means of a fibre or other frictional washer 33 located between a shoulder on rod 32 and the side face of head 29, and a pair of washers 34 and a pair of nuts 35. Nuts 35 are taken up sufficiently tightly to exert considerable frictional resistance to turning of bar 32, so as to rigidly hold the drill holding vise assembly securely in operative position, and yet, when it is desired to inspect the drill point or to change drills, the entire unit may be moved away from the grinding wheel by rocking bar 32 about its axis, as will be later described.

Rocking of bar 32 toward the wheel is limited by a split stop collar 36 secured to the bar by a cap screw 37, and having a stop pin 38 coacting with the upper face of head 29. As seen in Figure 2A, matching marks 39 and 41 are provided on bar 32 and collar 36 for locating them in the proper position to establish the generally standard clearance angle on the drill point being ground, it being understood however that if it is desired to increase or decrease the clearance angle, screw 37 may be loosened and the collar 36 rocked a slight distance one way or the other on bar 32 to stop the bar in the proper angular position to establish the desired clearance angle.

Bar 32 is also provided with a flat 43; a keyway 44; and threaded portion 45, which respectively cooperate with a clamp bolt 46; a key 47; and a feed knob 48 of a supporting bracket 49. Knob 48 is secured in bracket 49 in the same manner as knob 26 is secured in post 16, so that bracket 49 may be adjusted along bar 32 by rotating knob 48. Referring to Figure 3, it is apparent that bars 32 and 23 are disposed at right angles to each other and are disposed in vertical planes which intersect the vertical plane of the wheel axis by angles of thirty degrees and sixty degrees, respectively, and in addition to adjusting the entire assembly bodily toward and away from the wheel by loosening screw 17 and sliding shank 15 in and out of guideway 14, bar 23 may also be slid within support 16, and bracket 49 slid upon bar 32 to effect transverse adjustment of a support bracket, and also some degree of adjustment toward and away from the wheel.

Support bracket 49 is provided with a finger 51 having an accurately formed upwardly directed bearing face and is also provided with a narrow groove 52 which cooperates with the scale plate 53 of a feed screw bracket 54. The latter has a smooth lower face adapted to cooperate with the bearing face of support 51, and it is mounted for rocking movement by a screw 55 tapped into bracket 49. The latter may be tightened to lock the parts in rigid assembled relationship when the proper angular adjustment of the feed screw bracket has been achieved. As seen in Figure 2, scale plate 53 is provided with indicia marks or graduations denoting 135°, 118° and 82°, respectively, for setting feed screw bracket 54 in the proper position to grind the desired drill tip angle. To set the drill tip angle screw 55 is loosened and bracket 54 rocked to bring the proper scale graduation opposite notch 52 on bracket 51, and screw 55 is then tightened to lock the parts in adjusted position.

Rigidly secured in an upstanding boss 56 on bracket 54 is an externally threaded sleeve 57, each of the threads being provided with a notch to define a scribe line or micrometer reading line 58.

Accurately journalled for rocking movement in sleeve 57 is a feed screw shaft 59. Seating against a split washer 61, sprung into a groove 62 in shaft 59, is a compression spring 63, which reacts against the end of sleeve 57 and forces the conical end 64 of the shaft into tight engagement with a tapered seat in a micrometer thimble 65. The thimble is provided with graduations 66 which cooperate with scribe line 58 on sleeve 57, and it is apparent that by rotating the thimble shaft 59 may be projected by small increments out of the other end of sleeve 57, the pitch of the thread and the scale markings preferably being so spaced that each mark represents approximately two thousandths of an inch, in terms of endwise movement of the shaft.

Rigidly secured to the projecting end of shaft 59 is a clamp jaw shoe or body 68 which supports the two drill clamping jaws in novel manner, as will be hereinafter described, and also has a boss 69 into which a jaw rocking handle 71 is threaded. Adjustably secured to handle 71, by means of a set screw 72, is a stop arm 73, into which a thumb screw 74 is threaded, and it is adapted to be locked in place by a lock nut 75. Screw 74 is brought up against the end of the shank of the drill after it has been clamped in position and one lip of the drill has been ground. The assembly is then locked in place by handle 71, so that when the drill is turned over for grinding the other lip, it will be brought into exactly the same longitudinal position it occupied when grinding of the first lip was completed.

Also formed on body 68 is a boss 77, into which a stop screw 78 is threaded. This screw cooperates with the upper face of bracket 54 to limit rocking movement of the clamp jaw body to a predetermined angle of swing, particularly when grinding three- or four-lip drills, and it is adapted to be locked in adjusted position by a lock nut 79.

Referring more particularly to Figures 2, 5, 6 and 7, the clamp jaw body 68 is of elongated form and is provided with a pair of upwardly facing accurately formed slide surfaces 81, located either side of a groove or guideway 82. A pair of clamp jaws 83 and 84 have accurately formed bottom surfaces seating directly upon surfaces 81 of the jaw body and they are guided for accurate sliding movement thereover by means of keys or slides 85 and 86, respectively, which are secured thereto by screws 87 and 88, the screws being threaded into openings in the slides. As seen more particularly in Figures 6 and 7, screws 87 and 88 extend through a longitudinal slot 89 in the bottom of groove 82, and self locking nuts 91 are threaded thereon and taken up against the flat bottom surface of a shallow longitudinal recess in the bottom of the clamp jaw body with just sufficient tightness to hold the clamp jaws in snug sliding relationship with surfaces 81, it being observed in Figure 6 that a substantial clearance exists between the lower sides of slides 85 and 86 and the bottom of groove 82. This materially reduces the cost of manufacture as it is only necessary to accurately finish the slide surfaces 81, the two side walls 92 and 93 of guideway 82, and the bottom surface of the body with which nuts 91 cooperate. In order to positively restrain the jaws from rocking with respect to their keys, the latter preferably snugly seat in notches 94 in the jaws, as seen in Figure 6, with the result that the keys absorb all twisting torques developed during grinding.

Jaw 83 is of V-shape in transverse section and is provided with a stop or locating pin 96 adjacent the wheel for locating the drill in the proper position to be ground. Jaw 84 is of troughshaped form, so that drills of various diameters may be firmly gripped and rigidly held by engagement of the jaws at three lines of surface engagement, namely the single face of jaw 83 and the two opposite faces of the trough in jaw 84.

Both jaws are preferably positively actuated in both directions of movement by novel screw mechanism that will now be described.

Secured at each end of the body, by screws 98, are blocks 99 and 101, having notches 102 and 103 formed respectively in their lower sides for clearing the bars 85 and 86. Threaded into blocks 99 and 101 are clamp screws 104 and 105, which cooperate directly with jaws 83 and 84 respectively, so that by rotating the screws the jaws may be advanced toward each other. Retraction of the jaws is effected by flanges 106 formed on the screws, which coact with recesses or pockets 107 in the slides, it being understood that sufficient lost motion is provided so that, when the screws are in engagement with the jaws, flanges 106 will not contact the side walls of pockets 107, but that after the screws have been released and move away from the jaw a slight predetermined distance they will then engage the walls of pocket 107 and retract the slides and jaws.

Jaw 83 normally functions as a stationary abutment but is adjustable to adapt the apparatus to grinding different size drills, the latter being accurately mounted in the device on a common center line, irrespective of what diameter they may have. To this end, a scale plate 109, bearing indicia marks and graduation marks 111 corresponding to the diameters of the various drills the machine is capable of handling, is secured to the jaw body adjacent jaw 83 so that, by aligning the rear edge 112 of the jaw with the proper scale graduation, the device may be accurately set to grind any diameter drill within the range of drills capable of being handled by the attachment.

Operation

Before mounting the attachment to the particular grinder, screw 18 in the shank of support 16 is turned outward to a position where it will enter the T-slot with a slight drag on the screw head. This insures holding the horizontal alignment of the attachment during grinding. Screw 17 is then set firmly in place to anchor the attachment to the grinder.

Assuming that it is desired to grind 118° drill points (59°), and that a one-quarter inch diameter two-lip drill is involved, feed screw 55 is loosened, and support 54 is rocked until the 118° mark on scale 53 is brought into alignment with notch 52 on finger 51. Screw 55 is then tightened to lock the feed screw and support brackets together. Now by grasping either handle 71 or thimble 65 the entire attachment may be rocked downwardly away from the wheel about the axis of arm 32, so as to expose the graduations on jaw scale plate 109. Screw 104 is then turned one way or the other to bring the back face 112 of jaw 83 into line with the graduation denoting a one-quarter inch diameter. The drill is then inserted in the jaws, with the flute engaging the locating pin 96, and with the cutting lip extending approximately one-eighth inch beyond the end of the jaw. The drill is then gripped by tightening the right-hand jaw screw 105. The particular embodiment of the invention illustrated is capable of handling ⅛ to ⅝ inch diameter drills of the common two, three and four-lip types, but it is to be understood that the device may be modified to handle larger or smaller drills without departing from the spirit of the invention.

The feed screw thimble 65 is then backed off so as to expose about five-eighths to three-fourths of an inch of thread. The entire attachment is then rocked back toward the wheel until stop pin 38 contacts the top of head 29, which locates the assembly in the proper grinding position. Screw 17 is then backed off slightly and the shank of support 16 is then moved inward or outward in the guideway of the grinder to bring the drill lip approximately one-eighth inch from, and parallel with, the wheel face. Clamp bolt 25 is then loosened sufficiently to maintain a slight drag on arm 23 and knob 26 is turned to move the drill point toward the wheel. Since this movement is angular to the wheel face, it may be necessary to manipulate knob 48 in like manner, before the drill point is brought into the exact desired relationship to the wheel. These adjustments, in combination with the movement forward by means of the feed screw thimble, will bring the drill point into exact position for grinding. When the drill point is in proper location for grinding, the outer edge should be approximately three thirty seconds of an inch from the outer edge of the wheel face as seen in Figure 3 and, when the proper position has been obtained, screw 17 and clamp bolt 25 are taken up tightly, so as to rigidly lock the assembly in place. Also, if it is necessary during the adjusting operation to move bracket 49 along rod 32, clamp bolt 46 should also be tightened before starting grinding.

By means of the adjustments just described, the attachment is now in condition for grinding the drill and the grinder is accordingly started, and the drill point is fed into the wheel by turning the feed screw thimble clockwise by small increments, while simultaneously rocking the clamp jaw shoe upward and downward about the axis of the thimble by means of handle 71. We have found that very good results are obtained when the thimble is advanced one graduation (two thousandths of an inch) for each up-and-down rocking movement.

In Figure 3A we have diagrammatically illustrated the manner in which the drill tip is rocked with respect to the wheel periphery. In position (1) the drill tip is about to leave the wheel, the lever moving upwardly, in position (2) the lever is in its lowest position and the wheel is cutting the lip clearance angle, and in position (3) the lever is in its highest position and the drill has left the wheel.

After sufficient material has been removed by rocking and advancing the drill, the entire attachment is swung away from the wheel by rocking it downward about the axis of bar 32, and the graduation mark which lines up with the scribe line on the feed screw is noted. The feed screw thimble is then turned back one revolution to exactly the same graduation mark. Screw 72 is then loosened and stop arm 73 is moved along lever 71, until screw 74 abuts the drill shank, and is locked in this position by tightening screw 72. The drill is now released by backing off screw 105 so as to retract jaw 84, and the drill is turned 180° to locate to unground lip against the locating pin, and with the shank abutting screw 74. Jaw 84 is then again tightened. The grinding operation is then repeated, feeding the drill forwardly by small increments until the previously observed graduation on the thimble comes into alignment with the scribe line on the feed screw. By following this procedure both lips of the drill will be ground exactly equal and accurate centering of the drill point is assured. The graduations on the thimble have no function other than to serve as guides in grinding both lips equal.

If it is desired to grind either 82° or 135° points, screw 55 is loosened and feed screw support 54 is rocked to bring the proper graduation on scale 53 into alignment with notch 52 on support 49, and screw 55 locked. The grinding procedure is then the same as for the 118° point just described. When special points such as a 125° point is required, the operator should carefully choose the proper unmarked position on scale 53, or if desired additional graduations may be provided on the scale.

In grinding three and four lip drills the grinding procedure is the same as outlined for the regular two lip drills, except that the stop screw 78 (Figure 2) must be set to cooperate with the upper face of bracket 54 to prevent the adjacent lip from contacting the grinding wheel at the end of the rocking movement.

*Adjustments*

The improved drill grinding attachment is provided with four individual adjustments. The adjustment of the shank of support 16 in the grinder guideway permits movement inward to allow for wheel wear to a minimum diameter of five and one-half inches. The adjustment of bar 23 within support 16 by means of knob 26 provides angular adjustments to suit various widths of wheels, from eleven-sixteenths to one inch wide. The adjustment of feed screw support bracket 49 along bar 32, and also the adjustment by rotating the micrometer thimble, serves to bring the drill point into exact grinding position.

The stop pin is pre-set at the factory and has a match mark to establish the average clearance angle (12° to 15°) when marks 39 and 41 on bar 32 and collar 36, respectively, are brought into register. While this setting of the device will produce clearance angles which will take care of most all the drill grinding operations met with in practice, if it is desired to either increase or decrease the clearance angle this may be readily effected by loosening screw 37; holding stop pin 38 in contact with head 29; and rocking arm 32 with respect to the collar. For instance, if it is desired to increase the clearance angle, stop pin 38 is held in engagement with head 29, and the attachment rocked slightly downwardly or away from the wheel, while if it is desired to increase the clearance angle the unit is rocked toward the wheel. When the adjustment is complete, screw 37 is locked in place.

Since the web of a drill becomes thicker as it approaches the shank, with grinding drills that have been resharpened a number of times it may be desirable to thin the web, either by the "round-faced" method or the "notched point" method, both of which are well known in the art. The drill may then be inserted in the attachment and ground in the manner previously described.

In order to secure accurate drill grinding, it is necessary that the wheel be accurately dressed, otherwise poor results will be obtained. We have accordingly provided a novel wheel dresser attachment to be used in conjunction with, and to be sold as a part of, the drill grinder just described, and referring to Figures 8, 9 and 10 the drill grinding attachment is removed from the grinder by loosening screw 17 and withdrawing shank 15 from the guideway and replacing it by shank 115 of a support 116, which is held in place by a screw 117. Secured to support 116, by means of a link 118 and clamp bolt assemblies 119 and 121, is a slide rest 122, having a guideway 123, which is disposed exactly parallel to the axis of the grinder. Mounted for sliding movement over the face of slide rest 122 is a tool slide 124, having a rib 125 guided in groove 123. Mounted for sliding movement in an inclined bore 126 in the slide is the shank of a diamond dresser tool 127 having a dresser diamond point 128 and a handle 129. A ball 131, seating in an intersecting bore 132 in the slide, and backed up by spring 133 and a plug 134, applies pressure to the shank of the tool and prevents it from chattering during operation. Adjustably secured to the shank of the tool, by means of a thumb screw 135, is a push link 136. A push screw 137 threaded into the slide below the tool, and containing a groove 138 adapted to receive the forked lower end of link 136, is operative to feed the dresser toward the wheel.

To dress the wheel, the parts are assembled as just described, and thumb screw 135 is loosened and tool 127 is pushed forwardly against the resistance of detent 131 into proximity with the wheel. Thumb screw 135 is then tightened and push screw 137 is rotated the proper amount to bring the tool into the required dressing position. Slide 124 is then pulled along rest 122 to quickly slide the dresser across the wheel face. Too slow movement will smooth the wheel and impair its cutting qualities.

From the foregoing detailed disclosure it is apparent that the invention provides a drill grinding attachment which may be readily applied to existing grinders to grind a drill tip on the wheel periphery, embodies a plurality of adjustments, for moving it bodily toward and away from the wheel as well as across the face of the wheel, which insure proper positioning of the drill for grinding and at the same time permit the attachment to be successively advanced toward the wheel axis as the wheel wears down and decreases in diameter, the parts of the attachment being so designed as to avoid interference from wheel guards or other parts of the grinder to which it is applied; embodies a novel vise for efficiently and rigidly holding the drill in grinding position, with the drill axis located in a fixed plane irrespective of the drill diameter; embodies means for readily swinging the attachment away from the wheel, for drill inspection and drill changing purposes and yet which affords a stable support for the drill when swung back toward the wheel; has adjusting devices whereby the attachment may be readily adapted to the grinding of drills having different clearance and tip angles; provides a stop for limiting rocking of the drill holder when grinding three or four lip drills; and a novel wheel dresser is provided for rapidly and accurately dressing the wheel of the grinder to which the attachment is applied.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a grinding apparatus, a grinder wheel mounted for rotation about a substantially horizontal axis; a support; a bar having a portion held against rotational movement but mounted for endwise sliding movement in said support at an inclination to said wheel axis to selectively position a work piece with respect to said wheel, said bar having a portion extending at an angle to said first portion; a drill holding device mounted for slidable adjustment along said last-named portion of said bar; adjusting means for respectively moving said bar endwise in said support and said drill holding device along said portion of said bar whereby said device may be adjusted toward and away from the periphery of said wheel and also across the periphery thereof.

2. In a grinding machine embodying a grinding wheel rotatable about a horizontal axis, a support adapted to be secured to a stationary part of said grinding machine; a bar mounted for sliding movement endwise on said support along a line inclined to the axis of rotation of said wheel; a second bar secured to the free end of said first bar and inclined at a predetermined angle thereto, said second bar being mounted for movement about its axis on said first bar and embodying means for stopping it in a predetermined angular position with respect thereto; a bracket mounted for longitudinal sliding movement on said second bar; and a drill supporting device carried by said bracket and embodying means for advancing a drill toward the grinding wheel.

3. In a grinding machine embodying a grinding wheel rotatable about a horizontal axis, a support adapted to be secured to a stationary part of said grinding machine; a bar mounted for sliding movement endwise on said support along a line inclined to the axis of rotation of said wheel; a second bar secured to the free end of said first bar and inclined at a predetermined angle thereto; a bracket mounted for longitudinal sliding movement on said second bar and for limited rocking movement about the axis of said second bar; a drill supporting device carried by said bracket; and means for advancing a drill toward the grinding wheel, said bracket in its rocking movement moving the drill toward and away from the grinding wheel independently of said advancing means.

4. In a grinding machine having a grinding wheel and a guideway disposed substantially parallel to the plane of the wheel; a support having a portion mounted in said guideway and embodying means for locking it in adjusted position therein; a double armed supporting assembly having its two arms disposed substantially at ninety degrees to each other and inclined with respect to the axis of the wheel and one arm mounted for longitudinal sliding movement in said support and embodying means preventing it from rotating with respect thereto; a bracket mounted for longitudinal sliding movement on the other arm of said assembly and having means restraining it against rotation; and a drill holding device mounted on said bracket and embodying means for advancing a drill toward the grinding wheel.

5. In a grinding machine having a grinding wheel and a guideway disposed substantially parallel to the plane of the wheel; a support having a portion mounted in said guideway and embodying means for locking it in adjusted position therein; a double armed supporting assembly having one arm mounted for longitudinal sliding movement in said support and embodying means preventing it from rotating with respect thereto; a member threaded on said one arm of said double armed supporting assembly and coupled to said support for sliding said one arm in said support; a bracket mounted for longitudinal sliding movement on the other arm of said assembly and having means restraining it against rotation; a second member threaded on said other arm of said double armed supporting assembly and coupled to said bracket for sliding said bracket along said other arm; and a drill holding device mounted on said bracket and embodying means for advancing a drill toward the grinding wheel.

6. In a grinding machine, in combination with a grinding wheel mounted for rotation about a fixed axis and presenting a peripheral grinding face, a supporting bar mounted at an oblique angle with respect to the axis of said wheel; a bracket mounted for longitudinal sliding movement on said supporting bar; a drill holding device mounted on said bracket; micrometer means carried by said bracket for feeding said drill holding device and a drill toward the wheel face; for grinding the drill while it is held in proper position by said holding device; means mounting said bracket and said drill holding device for unitary rocking movement about the axis of said bar for shifting said drill away from the wheel face independently of said means for feeding said drill toward the wheel face; and stop means limiting movement of said bracket and said drill holding device toward the wheel face.

7. In a grinding machine, in combination with a grinding wheel mounted for rotation about a fixed axis and presenting a peripheral grinding face, a supporting bar mounted at an oblique angle with respect to the axis of said wheel; a bracket keyed against rotation with respect to but mounted for longitudinal sliding movement on said supporting bar; a drill holding device mounted on said bracket and embodying means for feeding a drill toward the wheel face; means mounting said bracket and said drill holding device for unitary rocking movement about the axis of said bar for shifting said drill away from the wheel face independently of said means for feeding said drill toward the wheel face comprising means mounting said bar for rotation about its axis and means providing a frictional turning resisting force operable to maintain said bar in adjusted angular position; and stop means limiting movement of said bracket and said drill holding device toward the wheel face.

8. In a grinding machine, in combination with a grinding wheel mounted for rotation about a fixed axis and presenting a peripheral grinding face, a supporting bar mounted at an oblique angle with respect to the axis of said wheel; a bracket mounted for longitudinal sliding movement on said supporting bar; a drill holding device mounted on said bracket; and embodying means for feeding a drill toward the wheel face; means mounting said bracket and said tool holding device for unitary rocking movement about the axis of said bar for shifting said drill away from the wheel face independently of said means for feeding said drill toward the wheel face; and stop means, comprising a member rigidly secured to but angularly adjustable upon said bar and carrying an abutment coacting with a stationary abutment, for limiting swinging movement of said bracket and said drill holding device toward the wheel face.

9. In a grinding machine, in combination with a grinding wheel mounted for rotation about a fixed axis and presenting a peripheral grinding face; a supporting bar mounted at one end in a support at an oblique angle with respect to the axis of said wheel for rocking movement about its axis in said support; a bracket mounted for longitudinal sliding movement on said supporting bar; a drill holding device mounted on said bracket and embodying means for feeding a drill toward the wheel face; means mounting said bracket and said drill holding device on a portion of said supporting bar for unitary rocking movement about the axis of said portion of said bar for shifting said drill away from the wheel face independently of said means for feeding said drill toward the wheel face; and stop means, comprising a collar mounted on said bar adjacent said support and carrying an abutment adapted to engage said support and arrest said bar in a predetermined angular position, means for clamping said collar to said bar in a plurality of adjusted angular positions and indicia means on said bar and said collar for locating them in predetermined relative angular relationship, limiting movement of said bracket and said drill holding device toward the wheel face.

10. In a drill grinding apparatus, a frame; a shaft journalled in said frame for rotation about a substantially horizontal axis and carrying a grinding wheel on one end thereof; a guideway provided in said frame and extending substantially parallel to the sides of said wheel; a support assembly comprising a post mounted in said guideway and a substantially horizontally disposed member mounted for endwise sliding movement in said post at an inclination to the shaft and extending from said guideway across the face of said wheel and terminating on the other side of said wheel in a bar disposed substantially at right angles thereto and at an inclination to the axis of said wheel; means for detachably locking said support assembly in said guideway; a drill gripping device mounted on said bar and operable to present one end of a drill to the periphery of said wheel, with the drill so disposed as to project the drill shank to said other side of said wheel and means for feeding said drill gripping device and drill toward said wheel periphery to effect grinding of said drill.

11. In a grinding apparatus, a drill holding device comprising a carrier body; a pair of guide members mounted for movement on said body toward and away from each other; a pair of vise jaws, one mounted on each guide member; and a pair of actuating members, one for each guide member and its associated vise jaw, threaded into said body and engaging behind its associated vise jaw when rotated in one direction to force said jaws and guide members together and engaging through a lost motion connection with its guide member for positively forcing said jaws and guide members apart when rotated in the opposite direction.

12. The grinding apparatus defined in claim 11, wherein said lost-motion connection comprises a member on each jaw having an abutment surface adapted to be contacted by its respective threaded member only when the latter is rotated a predetermined distance in a direction to force said jaws apart.

13. The grinding apparatus defined in claim 11, wherein said body is provided with a longitudinal guideway and said guide members comprise a pair of bars mounted for sliding movement in said guideway and rigidly connected to said jaws.

14. In a grinding apparatus, a device for holding a drill in cooperative relationship to a grinding wheel, comprising a longitudinally extending body; means mounting said body for rocking movement about a predetermined axis; said body having a longitudinal guideway in its upper face and said body terminating at each end in a boss overlying said guideway; a pair of bars mounted for longitudinal sliding movement in said guideway carrying drill gripping jaws at their inner ends and extending beyond said bosses; means for holding said jaws in sliding engagement with said body; and a screw threaded into each of said bosses and coacting with said jaws for advancing them into gripping engagement with a drill.

15. In a drill grinding apparatus, a work holding device for supporting a drill in operative relationship to a grinding wheel comprising a body having a slide surface and a predetermined transverse reference axis parallel to and in a plane normal to the longitudinal axis of said slide surface; a pair of jaws mounted for independent sliding movement along said slide surface and relatively to each other and said body; and indicia means coacting with said body and one of said jaws for indicating in terms of drill diameters the location of said one jaw with reference to said reference axis, whereby various diameter drills may be selectively gripped in said jaws with their axes positioned in alignment with the reference axis of said body.

16. In a grinding apparatus, in sub-combination, a vise body having a longitudinal guideway including side walls and a bottom wall, slide surfaces on said body either side of said guideway; a jaw mounted for sliding movement along said slide surfaces; a bar snugly fitting between the side walls of said guideway and tightly secured in a notch in the underside of said jaw, for maintaining the latter in predetermined angular relationship to said guideway and also guiding the same for accurate sliding movement along said slide surfaces exactly parallel to said guideway, said bar being so dimensioned as to lie out of contact with the bottom wall of said guideway; means for maintaining said jaw in sliding engagement with said slide surfaces, with said bar in said guideway; and actuating means for moving said jaw along said guideway.

17. The grinding apparatus defined in claim 16, wherein said means for maintaining said jaw in sliding engagement with said slide surfaces is also operable to secure said bar in said notch.

18. The grinding apparatus defined in claim 16, wherein said actuating means comprises a member movable parallel to said guideway and having a portion adapted to abut said jaw when it is moved in one direction and a portion adapted to abut said bar when it is moved in the opposite direction.

CHRISTY A. WIKEN.
HUGO V. BOEHNKE.

REFERENCES CITED

The following references are of record in the file of this patent:

UNITED STATES PATENTS

| Number | Name | Date |
| --- | --- | --- |
| 2,142,923 | Stocking | Jan. 3, 1939 |
| 887,059 | Belden | May 12, 1908 |
| 1,832,684 | Bath | Nov. 17, 1931 |
| 2,275,496 | Berg | Mar. 10, 1942 |
| 1,391,034 | Williams | Sept. 20, 1921 |
| 563,593 | Hoenscheid | July 7, 1896 |
| 978,851 | Crowther | Dec. 20, 1910 |
| 2,024,268 | Bausch, et al. | Dec. 17, 1935 |
| 2,142,923 | Stocking | Jan. 3, 1939 |